United States Patent [19]

Lippacher et al.

[11] Patent Number: 4,669,551

[45] Date of Patent: Jun. 2, 1987

[54] ELECTROPNEUMATIC HAMMER DRILL

[75] Inventors: Wolfgang Lippacher, Herrsching; Werner Theissig, Munich, both of Fed. Rep. of Germany

[73] Assignee: Hilti Aktiengesellschaft, Fürstentum, Liechtenstein

[21] Appl. No.: 808,679

[22] Filed: Dec. 13, 1985

Related U.S. Application Data

[63] Continuation of Ser. No. 583,937, Feb. 27, 1984, abandoned.

[30] Foreign Application Priority Data

Mar. 21, 1983 [DE] Fed. Rep. of Germany ....... 3310145

[51] Int. Cl.[4] ............................................ B23B 45/02

[52] U.S. Cl. .................................... 173/109; 173/116

[58] Field of Search ............................... 173/104, 109

[56] References Cited

U.S. PATENT DOCUMENTS

| | | | |
|---|---|---|---|
| 2,240,598 | 5/1941 | Wilke | 173/109 |
| 2,270,752 | 1/1942 | Drennon | 173/109 |
| 3,056,390 | 10/1962 | Nyholm | 173/109 |
| 3,828,865 | 8/1974 | Schnizler, Jr. | 173/109 |
| 4,014,392 | 3/1977 | Ross | 173/118 |
| 4,113,035 | 9/1978 | Stiltz et al. | 173/104 |
| 4,529,044 | 7/1985 | Klueber et al. | 173/48 |

FOREIGN PATENT DOCUMENTS

| | | | |
|---|---|---|---|
| 2757008 | 4/1982 | Fed. Rep. of Germany . | |
| 3152 | of 1914 | United Kingdom | 173/122 |

*Primary Examiner*—Donald R. Schran
*Assistant Examiner*—James L. Wolfe
*Attorney, Agent, or Firm*—Toren, McGeady & Associates

[57] ABSTRACT

An electropneumatic hammer drill includes a housing containing a guide cylinder in which an exciter piston and a percussion piston are displaceably mounted in spaced relation with an air cushion formed between them. A hollow shaft encircles the guide cylinder within the housing and transmits rotary motion to a tool mounted in the hammer drill. A crankshaft for reciprocating the exciter piston via a piston rod is supported in two bearings located in the guide cylinder. The percussion mechanism for the hammer drill made up of the guide cylinder, the exciter piston, the percussion piston, the crankshaft and the piston rod form a subassembly. The subassembly can be inserted into and removed from the hammer drill as a unit.

4 Claims, 1 Drawing Figure

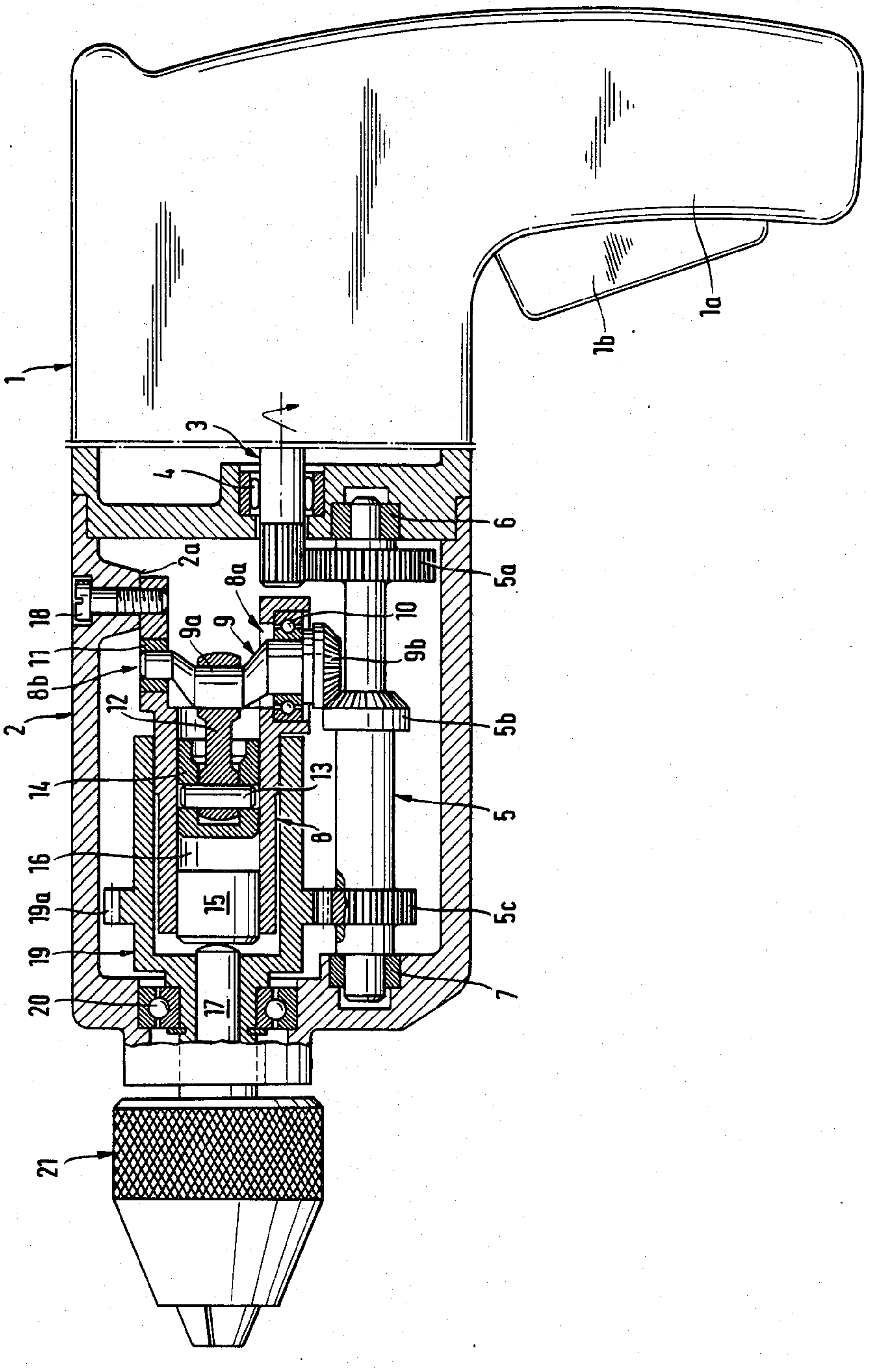
1
1a
1b
2
2a
3
4
5
5a
5b
5c
6
7
8
8a
8b
9
9a
9b
10
11
12
13
14
15
16
17
18
19
19a
20
21
A

ELECTROPNEUMATIC HAMMER DRILL

This is a continuation of application Ser. No. 583,937, now abandoned, filed Feb. 27, 1984.

SUMMARY OF THE INVENTION

The present invention is directed to a hammer drill including a housing formed of housing parts with a guide cylinder mounted in one of the housing parts. An exciter piston is mounted for reciprocal movement in the guide cylinder for transmitting such movement via an air cushion to a percussion piston also mounted in the guide cylinder. A hollow shaft laterally encloses at least a part of the guide cylinder and is mounted at least in part on the guide cylinder and serves to transmit rotary motion to a tool chucked into the hammer drill. A crankshaft with its axis of rotation extending perpendicularly to the axis of the guide cylinder is located within the housing.

Hammer drills of the above type are usually powered by an electric motor and, accordingly, they are commonly characterized as electropneumatic hammer drills. Such electropneumatic hammer drills have a considerably greater drilling efficiency than comparable percussion drills operated by the ratchet principle with the same power input. Hammer drills, however, are much more elaborate in design than percussion drills. Because of the more complicated arrangement of hammer drills they tend to be more complicated to produce and assemble.

One known hammer drill of this type has a fixed guide cylinder with an exciter piston and a percussion piston mounted in the cylinder so that they are axially movable. In addition, a hollow shaft, for transmitting rotary motion to a cutting tool mounted in the hammer drill, is positioned on the guide cylinder. As a result, the bearings for the pistons and the hollow shaft are disposed in the same part, while the bearings for the crankshaft are located in another part. The alignment of these bearings relative to one another requires great accuracy in the manufacture and assembly of the various parts.

Therefore, it is the primary object of the present invention to provide a hammer drill distinguished by simplified production and assembly.

In accordance with the present invention, at least one of the bearings for the crankshaft is located in the guide cylinder.

In accordance with the present invention, all of the important bearings for the percussion and rotary drive of the hammer drill can be combined in a single part. Such a part can be produced with the required accuracy so that no additional alignment is needed in assembly of the drill due to cumulative manufacturing tolerances.

Another feature of the invention is that the entire percussion mechanism including the crankshaft can be preassembled as a unit. If one component of the unitized percussion mechanism is damaged, the entire percussion unit can be removed and replaced by a few simple manipulations, and the damaged unit can be sent to a repair shop. The replacement of the percussion mechanism unit can be effected by a service man or, depending on the situation, by the operator himself.

In principle, locating one bearing for the crankshaft in the guide cylinder is sufficient. A second bearing would then be located in the drill housing. To simplify the assembly and afford an effective mounting of the crankshaft it is preferred if the two diametrically opposite crankshaft bearings are provided in the guide cylinder. In such an arrangement, the crankshaft is supported at two locations on the guide cylinder. Locating the bearings on both ends of the crank shaft result in an improved distribution of the bearing forces.

For a simple arrangement of the guide cylinder, it is advantageous if the bearings are located at the rear end of the guide cylinder, that is, the end more remote from the location in which a tool is positioned in the hammer drill. The bearings may be formed integrally with the guide cylinder or connected to it by a clamp or screw connection.

To prevent friction losses at the bearings as much as possible, it is preferable to form the bearings as antifriction bearings. In view of the limited space availability, ball or needle bearings are preferred.

The space available in small hammer drills is very limited. Accordingly, it is advantageous if the bearings are formed as friction bearings. If such bearings are adequately lubricated or if sintered metals are used, the bearing capacity and the life of friction bearings is sufficient.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a side elevational view, partly in section, of a hammer drill embodying the present invention.

DETAILED DESCRIPTION OF THE INVENTION

As shown in the drawing, the housing for a hammer drill is composed of a motor housing part 1 and a gear housing part 2. The motor housing 1 forms the rear half of the housing and includes an integral handle **1*a* and a trigger 1*b* for operating the drill. The motor housing part 1 and the gear housing part 2 are connected to one another. A motor shaft 3 projects forwardly out of the motor housing part 1 into the gear housing part 2. The motor shaft 3 is supported within the motor housing part 1 by a needle bearing 4. Within the gear housing part 2 a reduction gear shaft 5 is rotatably mounted extending parallel to and offset from the axis of the motor shaft 3. At its rear end, the reduction gearshaft 5 is rotatably mounted in a journal box 6 supported in the forward end of the motor housing part 1, while the forward end of the reduction gear shaft is rotatably mounted in the journal box 7 supported in the forward end of the gear housing part 2. The end of the motor shaft 3 extending into the gear housing part 2 is provided with gear teeth around its circumferential periphery and a gear 5*a* on the reduction gear shaft 5 meshes with the gear teeth on the motor shaft. A guide cylinder 8 is located within the gear housing part 2. The axis of the guide cylinder 8 is disposed in parallel relation with the reduction gear shaft 5 and is spaced laterally from the gear shaft. At its rear end, the guide cylinder 8 is provided with two oppositely disposed bearings 8*a*, 8*b* for a crankshaft 9. The axis of rotation of the crankshaft extends perpendicularly to the axis of the guide cylinder 8. The crankshaft is supported by an antifriction bearing 10 at bearing 8***a* and by a friction bearing 11 at bearing 8*b* the guide cylinder. Between the bearings, crankshaft 9 has a lifting cam 9*a* connected to the piston rod 12 which extends forwardly into the guide cylinder 8. The forward end of the piston rod is connected by a piston bolt 13 to an exciter piston 14 reciprocally mounted in the guide cylinder. A percussion piston 15 is located within the guide cylinder spaced forwardly from the exciter piston and the percussion piston is also reciprocally movable in the cylinder. An air cushion 16 is formed between the rear end of the percussion piston 15 and the front end of the exciter piston 14. While the cushion 16 prevents contact between the exciter piston 14 and the percussion piston 15, it transmits the movement of the exciter piston to the percussion piston. In turn, as the percussion piston 15 reciprocates within the guide cylinder 8, it strikes an axially movable anvil 17 which drives a tool, not shown, chucked into the drill chuck 21.

At the lower end of the crankshaft 9, as viewed in the drawing, facing toward the reduction gear shaft 5, a bevel gear 9*b* is in meshed engagement with a bevel gear 5*b* located on the reduction gear shaft 5. Consequently, the crankshaft 9 is rotated by the motor shaft 3 via the reduction gear shaft 5. Gear housing part 2 has an inwardly directed projection forming a surface 2*a* which supports the rear end of the guide cylinder and the guide cylinder may be attached to the gear housing part by one or more screws 18. The axially extending cylindrically shaped front part of the guide cylinder 8 is laterally enclosed by a hollow shaft 19. Hollow shaft 19 is rotatably mounted on the guide cylinder, note its bearing contact with the outer surface of the guide cylinder at its rear end. Further, the front part of the hollow shaft is supported in the gear housing part 2 by a ball bearing 20. On its outer surface, intermediate its front and rear end, the hollow shaft has an integral ring gear 19*a* in meshed engagement with another gear 5*c* located on the reduction gear shaft 5 toward the front end of the reduction gear shaft. The gear 5*c* rotates the hollow shaft 19 about its axis and such rotation is transmitted from the hollow shaft to a tool, not shown, positioned in the drill chuck 21.

In accordance with the arrangement embodying the present invention, the percussion mechanism made up of the guide cylinder 8, the crankshaft 9, the exciter piston 14 and the percussion piston 15 can be put together as a subassembly unit and subsequently inserted into the gear housing. In case one of the components of the percussion mechanism is damaged, the entire percussion mechanism-subassembly unit can be replaced with a few manipulations.

While specific embodiments of the invention have been shown and described in detail to illustrate the application of the inventive principles, it will be understood that the invention may be embodied otherwise without departing from such principles.

We claim:

1. Hammer drill comprising a housing having a front end and an opposite rear end, said housing having a gear housing part and a motor housing part, a hollow guide cylinder positioned within the gear housing part of said housing and having an axis extending in the front end-rear end direction, an exciter piston mounted within said guide cylinder, a percussion piston slidably displaceably mounted in said guide cylinder closer to the front end of said housing than said exciter piston, said percussion piston disposed in axially spaced relation with said exciter piston and an air cushion formed therebetween so that the reciprocal movement of said exciter piston is transmitted via the air cushion to said percussion piston, a hollow shaft rotatably mounted in said gear housing part of said housing with the axis thereof extending in the front end-rear end direction, said hollow shaft laterally encircles at least an axially extending part of said guide cylinder and is arranged to transmit the rotary motion thereof to a tool mounted in the front end of said housing, a crankshaft located within said housing and operably connected to said exciter piston with the axis of said cranksahft extending perpendicularly of the axis of said guide cylinder, wherein the improvement comprises releasable means for securing said guide cylinder to said gear housing part of said housing so that said guide cylinder is held in a stationary position wholly within said gear housing part, said guide cylinder is open at the opposite ends thereof, said exciter piston is reciprocally movable in the axial direction of and relative to said guide cylinder, two diametrically opposed bearings for said crankshaft are located completely within the end of said guide cylinder closer to the rear end of said housing, said crankshaft extending between and mounted in said diametrically opposed bearings so that the axis of said crankshaft remains within the end of said guide cylinder closer to the rear end of said housing, means within said gear housing part for driving said crankshaft and said crankshaft engages said means laterally outwardly from said guide cylinder and is releasably disengageable from said means, said guide cylinder, exciter piston, percussion piston, crankshaft form a subassembly unit which can be replaced as a unit within said housing of said hammer drill when said gear housing part and motor housing part are separated, said means are released from securing said cylinder.

2. Hammer drill, as set forth in claim 1, wherein one of said bearings for said crankshaft is an antifriction bearing.

3. Hammer drill, as set forth in claim 1, wherein one of said bearings for said crankshaft is a friction bearing.

4. Hammer drill, as set forth in claim 1, wherein said means for driving said crankshaft comprises a motor shaft mounted in said motor housing part and extending therefrom into said gear housing part, the end of said motor shaft within said gear housing part having teeth formed thereon around the circumferential periphery thereof, a reduction gear shaft rotatably mounted in said gear housing part and having a gear thereon in meshed engagement with the teeth in said motor shaft so that said motor shaft drives said gear reduction shaft, a first bevel gear located on said crankshaft, a second bevel gear located on said gear reduction shaft with said first and second bevel gears in meshed engagement so that said motor shaft through said gear reduction shaft drives said crankshaft and reciprocally moves said exciter piston within said guide cylinder, a ring gear formed integrally on the outside surface of said hollow shaft, a second gear mounted on said gear reduction shaft and disposed in meshed engagement with said ring gear on said hollow shaft for rotating said hollow shaft relative to said guide cylinder, said means for securing said guide cylinder located within said gear housing part and including connectors for securing said guide cylinder to said gear housing part whereby upon removal of said connectors said guide cylinder can be removed from said housing, and said hollow shaft being rotatably mounted adjacent the front end of said housing on said gear housing part and being slidably supported at a spaced location from the front end of said housing on said guide cylinder, and said subassembly unit capable of being replaced as unit within said gear housing part of said housing when said connectors are removed.

* * * * *